March 7, 1944.  L. S. WILLIAMS  2,343,623
WEIGHING SCALE
Filed Dec. 31, 1942  3 Sheets-Sheet 1
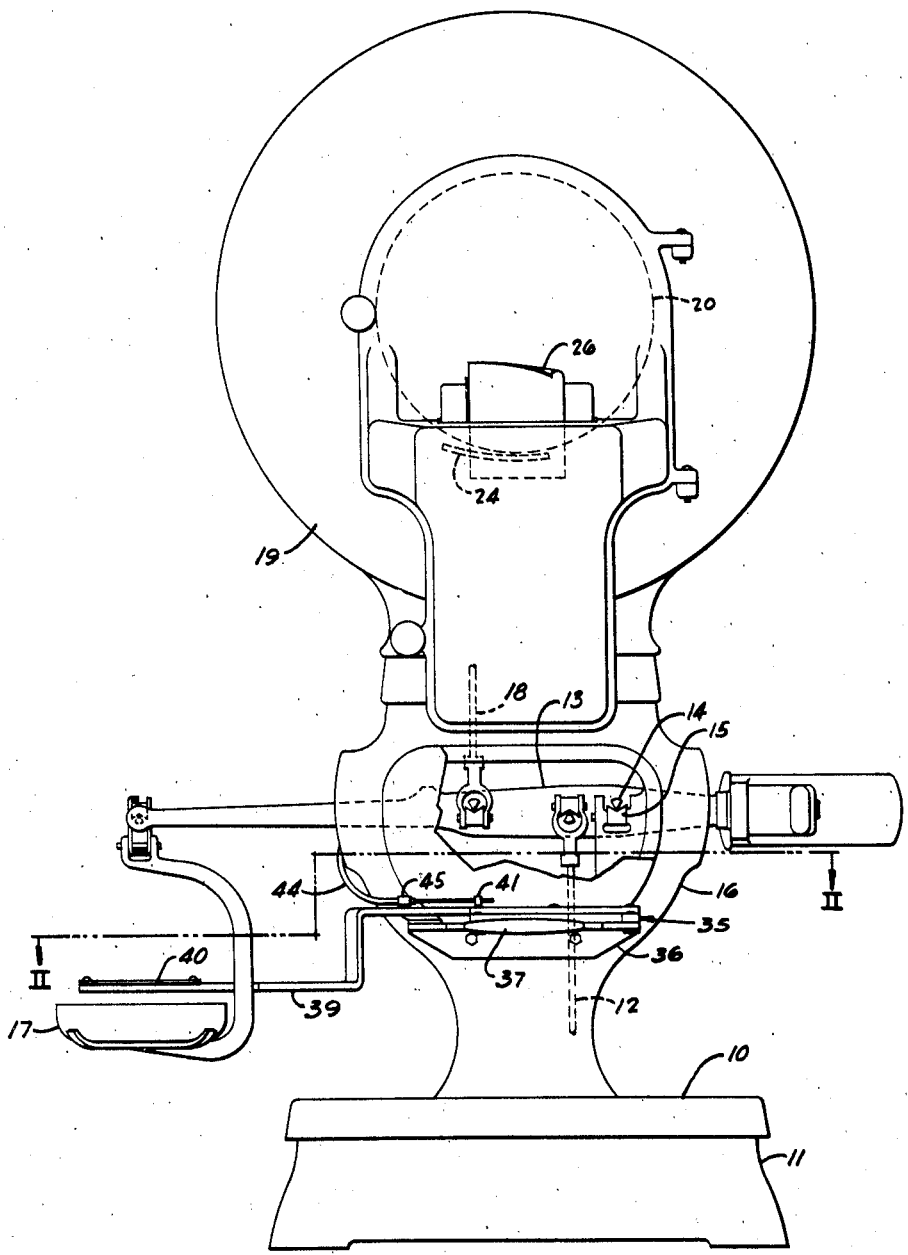
Fig. I
Lawrence S. Williams
INVENTOR.
BY Marshall & Marshall
ATTORNEYS

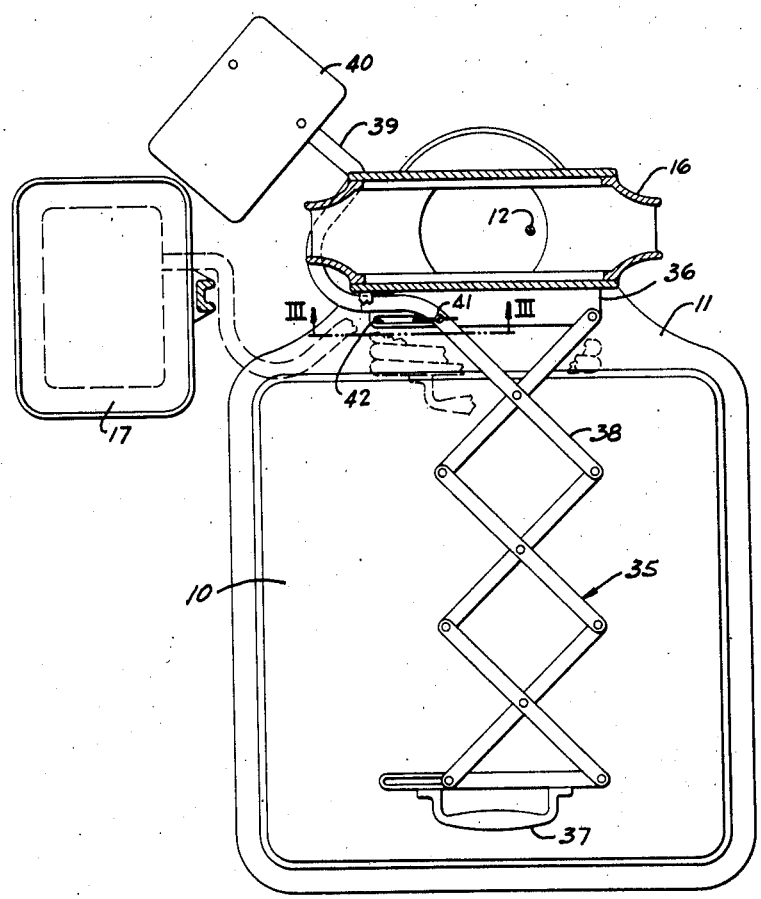
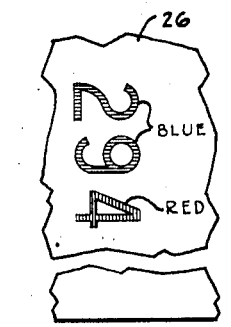
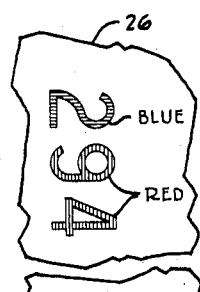
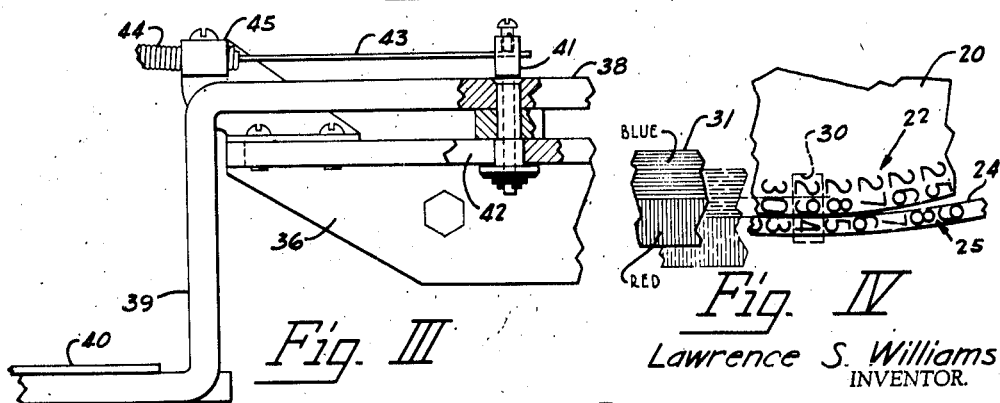

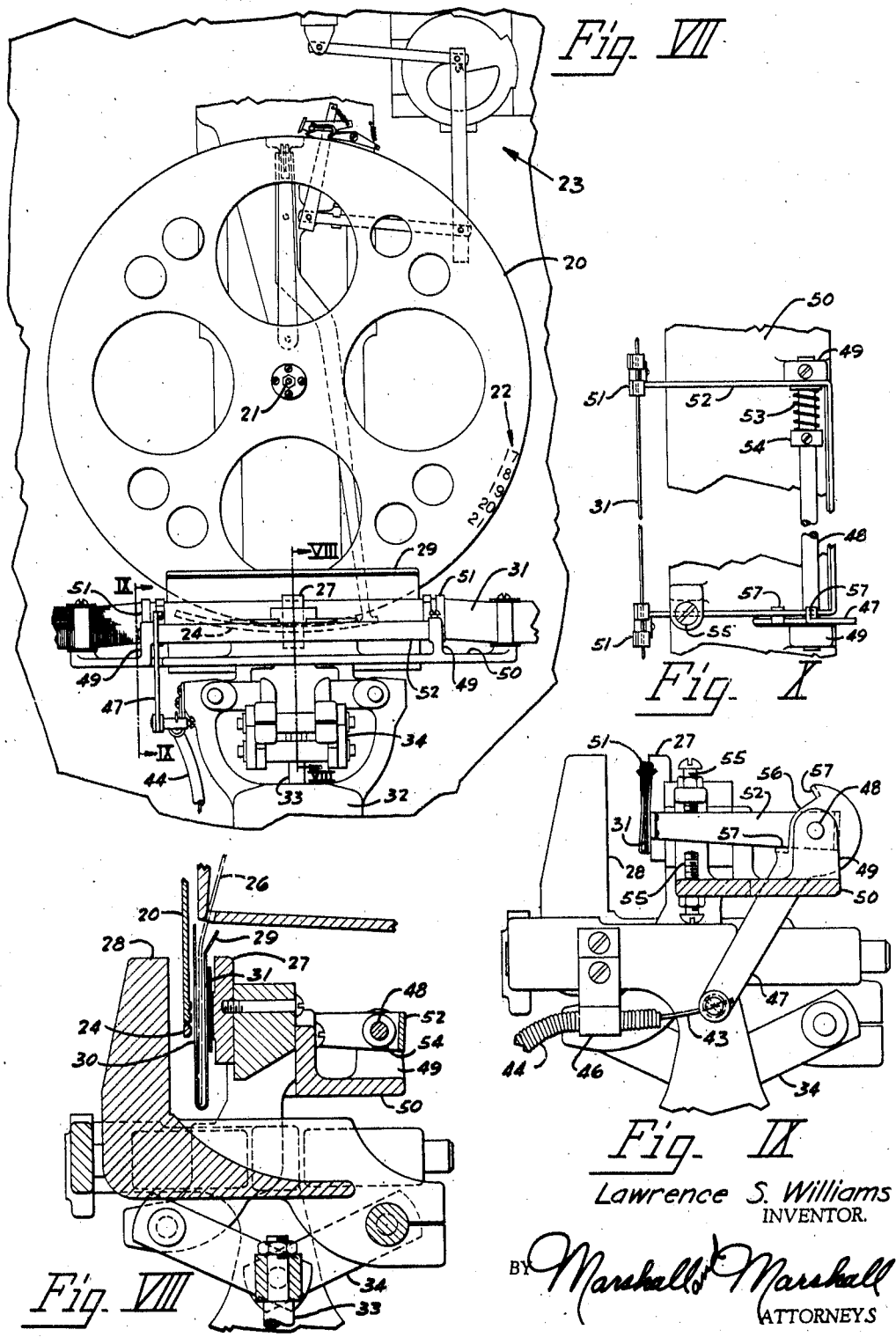

Patented Mar. 7, 1944

2,343,623

UNITED STATES PATENT OFFICE 2,343,623

WEIGHING SCALE

Lawrence S. Williams, Toledo, Ohio, assignor to Toledo Scale Company, Toledo, Ohio, a corporation of New Jersey Application December 31, 1942, Serial No. 470,752

6 Claims. (Cl. 265—5)

This invention relates to weighing scales.

It is an object of this invention to provide a weighing scale having two different maximum capacities and a weight printing attachment and means for changing the capacity and the printing of the weights in accordance with such change.

It is another object of this invention to provide a weight printing scale having an indication in which figures recording decimal fractions of units of weight are printed in one color and figures recording units of weight are printed in another color.

It is a further object of this invention to provide a weighing scale having two load receiving members connected to a common load counterbalancing mechanism and a printing attachment which records the weights of articles weighed on either of the two load receiving members in terms of the capacities of such load receiving members.

A still further object of this invention is to provide a two capacity scale having two separate load receivers, means for preventing the use of one of such load receivers when the other is in use and means for varying the indication of printing attachment in accordance with that one of such load receivers which is being used.

More specific objects and advantages are apparent from the description, in which reference is had to the accompanying drawings illustrating a preferred form of scale embodying the invention.

In the drawings:

Fig. I is a view in elevation of a weighing scale embodying the invention.

Fig. II is a view taken substantially on the line II—II of Fig. I.

Fig. III is a greatly enlarged fragmentary view taken substantially from the position indicated by the line III—III in Fig. II.

Fig IV is a fragmentary view in elevation showing the means of changing the printing indication in accordance with the use of the two different capacities of the scale illustrated in Fig. I.

Figs. V and VI are fragmentary illustrations showing the printed indication provided by the scale illustrated in Fig. I.

Fig. VII is a fragmentary view in elevation of indication printing mechanism employed in the scale illustrated in Fig. I.

Fig. VIII is a greatly enlarged vertical sectional view taken substantially on the line VIII—VIII of Fig. VII.

Fig. IX is a fragmentary view in elevation taken substantially from the position shown by the line IX—IX in Fig. VII.

Fig. X is a fragmentary plan view of portions of the mechanism shown in Fig. IX.

These specific drawings and the specific description that follows merely disclose and illustrate the invention and are not intended to impose limitations upon the claims.

A load receving platter 10 is mounted on levers (not shown) in a base 11 and is connected by such levers to a vertical pullrod 12, the upper end of which is pivotally connected to a lever 13. The lever 13 is mounted by fulcrum pivots 14 in bearings 15 which are located in the interior of a columnar housing 16 erected at the rear of the base 11. A second load receiver comprising a pan 17 is pivotally hung from the outermost end of the main lever 13. The ratio between the pivot distances of the pullrod 12 and the hanging pan 17 from the fulcrum pivot 14 is 10 to 1 and thus an object placed in the pan 17 exerts 10 times as much force on the lever 13 as does the same object when placed on the platter 10; or, an object placed in the pan 17 which weighs one-tenth as much as an object placed on the platter 10, exerts the same amount of force on the lever 13.

The lever 13 is connected, by means of a pullrod 18 extending upwardly through the housing 16 and into the interior of a dial housing 19 which is mounted thereon, to force counterbalancing mechanism (not shown) located inside the housing 19.

A disk 20 (see Fig. VII) is mounted upon a shaft 21 which is rotated by the force counterbalancing mechanism in response to force created by a load placed either upon the platter 10 or the pan 17. The disk 20 bears a series of weight indicia 22.

A selection mechanism, indicated generally by the numeral 23, cooperates with the disk 20 and is controlled by its position under a load to move an arcuate strip 24 (see also Fig. IV) which bears a series of indicia 25 made up of digits "0" to "9" inclusive. (The mechanism 23 is a motor and cam driven variation of the chart positioning for printing mechanism disclosed in United States Patent No. 2,288,761 and as it does not form part of the instant invention it, therefore, is not fully disclosed herein). The arcuate strip 24 is moved by the mechanism 23 into a position where that one of the type borne by it corresponding to the increment of weight over and above that one of the indicia 22 (borne by the disk 20) just smaller than the object being weighed is positioned adjacent such indicium of the series 22. Both the disk 20 and the strip 24 are then moved by the mechanism into a position to be printed which is outlined in Fig. IV (the type "294" being shown therein).

The type so moved into printing position by the disk 20 and the strip 24 are squeezed against a card or other impression receiving medium 26 (Figs. I and VIII) by means of a co-acting platen 27 and abutment 28. The inner edge of the disk 20 and the strip 24 extend between opposed faces of the platen 27 and the abutment 28. A card guide 29 is located immediately in front of the disk 20 having an aperture 30 located in the position into which the type borne by the disk and the strip are lined up to be printed. A two color ribbon 31 also extends between the faces of the platen and the abutment on that side of the card guide 29 furtherest removed from the disk 20 and strip 24.

After the disk 20 and strip 24 have been positioned, printing is accomplished by the energization of a solenoid 32 which pulls upwardly on its core rod 33 and through a pair of toggle links 34 squeezes the abutment 28 and platen 27 together, thereby imprinting the type in line with the aperture on the card 26.

A collapsible frame 35 (constructed similar to a "lazy tongs" or pantograph) is mounted for horizontal extension on a bracket 36 secured to the front of the housing 16. A handle 37 is secured to the front of the frame 35 for collapsing or extending the frame. A rearmost member 38 of the frame 35 is elongated and formed into an arm 39 on the outermost end of which there is attached a horizontal plate 40. When the frame 35 is extended by pulling the handle 37 forward over the platter 10 (as shown in solid lines in Fig. II) the plate 40 is moved to the rear of the pan 17 which it overlies when the frame 35 is collapsed (as shown in dotted lines in Fig. II). A pin 41 which is riveted to the member 38 extends downwardly through a slot 42 in the bracket 36 and moves sideways when the frame 35 is extended or collapsed. An inner wire 43 of a Bowden cable 44 is secured to the pin 41, the cable 44 being held in a clamp 45 mounted on the bracket 36. The Bowden cable 44 extends into the housing 19 being secured by a clamp 46 to the main frame on which the platen 27 and abutment 28 are mounted (as shown in Fig. IX). The end of the inner wire 43 is secured to the lower end of a rocker arm 47 which is mounted on a rod 48 secured in two ears 49 extending upwardly from a frame member 50. Two guides 51 for the two color ribbon 31 are mounted at the ends of the arms of a U shaped frame 52 which is rockingly mounted on the rod 48. A coil spring 53 surrounds the rod 48 one end being secured to the frame 52 and the other end to a collar 54 on the rod 48. The spring 53 urges the frame 52 to swing upwardly (in a clockwise direction, Fig. IX). The rocking movement of the frame 52 is limited by a pair of adjustable stops 55 which are threaded through portions of the frame member 50. The rocker arm 47 is connected to the frame 52 by means of a lost motion connection which may be formed by cutting an arcuate opening 56 in its hub and forming upper and lower tabs 57 to the ends of the slot 56 which engage the frame 52 when the rocker arm 47 is swung.

Thus when the frame 35 is extended over the platter 10 the rocker arm 47 and the frame 52 are in the position shown in Fig. IX and the two color ribbon 31 is in its upper position as shown in Fig. IV. The dividing line between the two colors in the ribbon then lies between the numerals in the series of indicia 22 borne by the disk 20 and when the indicia are printed the indication is as shown in Fig. V where the weight of the article weighed in the pan 17 is shown as 2.94 increments of weight. When the frame 35 is collapsed and the plate 40 positioned to overlie the pan 17, the rocker arm 47 is swung in a counterclockwise direction (see Fig. IX) and its upper tab 57 swings the frame 52 in the same direction. This moves the two color ribbon 31 down into its lower position (as shown in dotted lines in Fig. IV) and the dividing line between the two colors now lies between the periphery of the disk 20 and the strip 24. The indication printed by the scale (in the event that the article placed on the platter 10 is 10 times as heavy as the article weighed in the pan 17 as above described) is 29.4 increments of weight as shown in Fig. VI.

The scale thus has two weighing capacities and means for changing its printed indication in accordance with the capacity being employed.

The embodiment of the invention that has been disclosed may be modified to meet various requirements.

Having described my invention, I claim:

1. In a weighing scale, in combination, load counterbalancing mechanism, a weight printing device controlled thereby, a plurality of load receivers, each of said load receivers being so connected to said load counterbalancing mechanism that there exists a fixed ratio between the weighing capacities of said load receivers and between the weights of loads which when placed on said load receivers cause said load counterbalancing mechanism to react to the same extent, means for selecting that one of said load receivers upon which a particular load is to be weighed and other means for conditioning said weight printing device to print the weight of a load in terms of the capacity of that one of said load receivers upon which it is weighed.

2. In a weighing scale, in combination, load counterbalancing mechanism, a weight indicating device controlled thereby, a plurality of load receivers, each of said load receivers being so connected to said load counterbalancing mechanism that there exists a fixed ratio between the weighing capacities of said load receivers and between the weights of loads which, when placed on said load receivers, cause said load counterbalancing mechanism to react to the same extent, a guard positionable above each of said load receivers, said guards being so interconnected that only one can be removed from above its associated load receiver at a time and means for conditioning said weight indicating device to indicate the weight of a load in terms of the capacity of that one of said load receivers upon which it is weighed.

3. In a weighing scale, in combination, load counterbalancing mechanism, a weight printing device controlled thereby, a plurality of load receivers, each of said load receivers being so connected to said load counterbalancing mechanism that there exists a fixed ratio between the weighing capacities of said load receivers and between the weights of loads which, when placed on said load receivers, cause said load counterbalancing mechanism to react to the same extent, said weight printing device being adapted to print the weights of loads weighed on either of said load receivers and including a member bearing printing indicia and an impression taking medium, and means for changing the impression taken in accordance with and in terms of the capacity of that one of said load receivers employed.

4. In a weighing scale, in combination, load counterbalancing mechanism, a weight printing device controlled thereby, a plurality of load receivers, each of said load receivers being so connected to said load counterbalancing mechanism that there exists a fixed ratio between the weighing capacities of said load receivers and between the weights of loads which, when placed on said load receivers, cause said load counterbalancing mechanism to react to the same extent, said weight printing device comprising an indicia bearing element, an impression taking medium and means for changing the impression taken in accordance with and in terms of the capacity of that one of said load receivers employed, and a plurality of guards, each being positionable above one of said load receivers and so interconnected that said guards cannot be simultaneously removed from above their associated load receivers.

5. In a weighing scale, in combination, load counterbalancing mechanism, a plurality of load receivers so connected thereto that there is a decimal ratio between the capacities of said load receivers and the weights of loads which, when placed on said load receivers, cause said load counterbalancing mechanism to react to the same extent, a weight printing device comprising an element bearing indicia arranged in decimal relationship and means for printing the integers and proper decimals of weights in different colors, and mechanism for conditioning the last named means for printing said indicia with the decimal point set forth by color difference at a point in accordance with that one of said load receivers being employed.

6. In a weighing scale, in combination, load counterbalancing mechanism, a plurality of load receivers so connected thereto that there is a decimal ratio between the capacities of said load receivers and the weights of loads, which, when placed on said load receivers, cause said load counterbalancing mechanism to react to the same extent, a weight printing device comprising an element bearing weight indicia arranged in decimal relationship, and a longitudinally divided two-color ribbon variably positionable with the dividing line between said colors located between adjacent digits in each of said indicia, and means for shifting said ribbon in accordance with that one of said load receivers being employed for printing said indicia in terms of the capacity of such load receiver.

LAWRENCE S. WILLIAMS.